United States Patent
Chiou

(10) Patent No.: US 7,603,591 B2
(45) Date of Patent: Oct. 13, 2009

(54) APPARATUS SELECTIVELY ADOPTING DIFFERENT DETERMINING CRITERIA IN ERASURE MARKING PROCEDURE WHEN PERFORMING DECODING PROCESS, AND METHOD THEREOF

(75) Inventor: Rong-Liang Chiou, Hsin-Chu (TW)

(73) Assignee: Mediatek Incorporation, Hsin-Chu, Hsien (TW)

( * ) Notice: Subject to any disclaimer, the term of this patent is extended or adjusted under 35 U.S.C. 154(b) by 371 days.

(21) Appl. No.: 11/161,014

(22) Filed: Jul. 19, 2005

(65) Prior Publication Data

US 2007/0022357 A1 Jan. 25, 2007

(51) Int. Cl.
G06F 11/00 (2006.01)

(52) U.S. Cl. ............... 714/704; 714/755; 714/786

(58) Field of Classification Search ......... 714/751–755, 714/780
See application file for complete search history.

(56) References Cited

U.S. PATENT DOCUMENTS

| | | | |
|---|---|---|---|
| 4,653,052 A | 3/1987 | Doi | |
| 5,434,886 A | 7/1995 | Kazawa | |
| 5,708,665 A | 1/1998 | Luthi | |
| 5,715,262 A | 2/1998 | Gupta | |
| 5,812,603 A | 9/1998 | Luthi | |
| 5,875,199 A * | 2/1999 | Luthi | 714/780 |
| 5,968,198 A * | 10/1999 | Hassan et al. | 714/752 |
| 5,996,103 A | 11/1999 | Jahanghir | |
| 6,011,817 A | 1/2000 | Bergmans | |
| 6,044,485 A | 3/2000 | Dent | |
| 6,108,811 A | 8/2000 | Nakamura et al. | |
| 6,209,112 B1 | 3/2001 | Stevenson | |
| 6,580,930 B1 | 6/2003 | Fulghum | |
| 7,047,474 B2 * | 5/2006 | Rhee et al. | 714/755 |
| 7,236,536 B2 * | 6/2007 | Hochwald et al. | 375/265 |
| 7,237,173 B2 * | 6/2007 | Morita et al. | 714/755 |
| 7,478,306 B2 | 1/2009 | Okamoto | |
| 2003/0026028 A1 * | 2/2003 | Ichihara et al. | 360/65 |
| 2003/0192001 A1 | 10/2003 | Maiuzzo | |
| 2004/0030984 A1 | 2/2004 | Renaud | |
| 2004/0061964 A1 | 4/2004 | Akamatsu | |
| 2005/0078640 A1 * | 4/2005 | Kim et al. | 370/335 |
| 2005/0120286 A1 * | 6/2005 | Akamatsu | 714/792 |

\* cited by examiner

*Primary Examiner*—Guy J Lamarre
*Assistant Examiner*—Sam Rizk
(74) *Attorney, Agent, or Firm*—Winston Hsu

(57) ABSTRACT

A method and a related apparatus that decode an input signal to generate an output signal. The method includes determining burst noise locations corresponding to the input signal and generating a first indication signal accordingly, decoding the input signal to generate an inner-code decoded signal, selectively adopting one of a plurality of determining criteria according to the first indication signal to determine reliability information corresponding to the inner-code decoded signal and to generate a second indication signal accordingly, and decoding the inner-code decoded signal with reference to the second indication signal to generate the output signal.

8 Claims, 5 Drawing Sheets

APPARATUS SELECTIVELY ADOPTING DIFFERENT DETERMINING CRITERIA IN ERASURE MARKING PROCEDURE WHEN PERFORMING DECODING PROCESS, AND METHOD THEREOF

BACKGROUND

The present invention relates to an apparatus for performing a decoding process, and more particularly, to an apparatus that selectively adopts different determining criteria in an erasure marking procedure when performing a decoding process, and a method thereof.

Various types of noise, distortion, and interference are commonly seen factors that deteriorate signal communication quality and cause an output of a communication channel to be different from its input. Error-correcting coding is a technique that can be adopted in digital communication systems to help transceivers resist the above-mentioned factors, reduce the probability of errors, and enhance the reliability of the outputted data.

Concatenated coding is a kind of error-correcting coding technique that implements multiple levels of coding. Generally speaking, inner and outer codes are commonly applied to provide two levels of coding. For example, convolutional codes or Trellis-Coded-Modulation (TCM) codes could be used as the inner codes, which help to overcome scattered random errors. Reed-Solomon (RS) codes or BCH codes could be used as the outer codes, which help to overcome burst errors.

Please refer to FIG. 1, which shows a schematic diagram of a receiver for decoding concatenated codes. The receiver 100 shown in FIG. 1 comprises a demodulator 110, an inner decoder 120, a deinterleaver 130, and an outer decoder 140. The demodulator 110 may comprise analog-to-digital converters for converting analog signals into digital signals, a mixer for transferring frequency from a radio frequency (RF) into an intermediate frequency (IF) or baseband, filters for anti-aliasing, a synchronization means for timing or frequency recovery, and an equalizer for compensating fading or impairment channel effects. After some or all of the above-mentioned operations are performed, the demodulator 110 then generates a demodulated signal.

Depending on which kind of inner code is utilized, a Viterbi decoder or a TCM decoder could implement the inner decoder 120, which decodes the demodulated signal to generate an inner-code decoded signal. Then, the deinterleaver 130 deinterleaves the inner-code decoded signal to generate a deinterleaved signal. The deinterleaver 130 plays an important role in scattering some kinds of burst noise in order to share the error-correction burden.

Depending on which kind of outer code is utilized, the outer decoder 140 could be implemented by an RS decoder or a BCH decoder. For example, when RS codes are utilized as the outer codes, an RS error decoder can be used as the outer decoder 140. The RS error decoder 140 can correct a maximum of t errors for an (n, k, 2t) RS code. In other words, the RS error decoder 140 has an error correction capability of t errors per codeword. However, in some communication systems, especially in terrestrial broadcasting systems, complex multi-path channels would induce severe fading or interference that the equalizer of the demodulator 110 cannot compensate entirely. In such circumstances, burst noise may causes errors of the inner decoder 120 to propagate to the outer decoder 140 and even the deinterleaver 130 cannot scatter them efficiently. The outer decoder 140 with only t-error correction capability may not be sufficient.

If the receiver 100 is further provided with a reliability-determining unit (not shown in FIG. 1) that determines unreliable locations corresponding to the inner-code decoded signal and generates an indication signal to indicate the unreliable locations, the outer decoder 140 can be upgraded to an RS error-erasure decoder. Different from the above-mentioned RS error decoder, an RS error-erasure decoder can correct x errors and y erasures for an (n, k, 2t) RS code, only if $2x+y \leq 2t$. That is, if an RS error-erasure decoder implements the outer decoder 140, a correction capability of t errors or 2t erasures per codeword can be achieved. In other words, the RS error-erasure decoder 140 has the opportunity to correct codewords with an actual error number that is larger than t if it is informed with some error locations marked as erasures.

In the related art, the additionally provided reliability-determining unit determines the reliability information corresponding to the inner-code decoded signal according to a changeless criterion. The changeless criterion works fine for only certain situations. For other situations, the changeless criterion might lead to erroneous erasure marking. When the reliability-determining unit erroneously generates erasure marks, the error correction capability of the error-erasure decoder 140 will be taken up by the erroneously generated erasure marks. Even worse, the erroneously generated erasure marks received by the error-erasure decoder 140 might cause the error-erasure decoder 140 to generate incorrect symbol(s) in its output signal.

SUMMARY

According to the claimed invention, an apparatus for decoding an input signal to generate an output signal is disclosed. The apparatus comprises a noise detector, an inner decoder, a reliability-determining unit, and an outer decoder. The noise detector determines burst noise locations corresponding to the input signal and generates a first indication signal accordingly. The inner decoder decodes the input signal to generate an inner-code decoded signal. The reliability-determining unit is coupled to the noise detector and selectively adopts one of a plurality of determining criteria according to the first indication signal to determine reliability information corresponding to the inner-code decoded signal and to generate a second indication signal accordingly. The outer decoder is coupled to the inner decoder and the reliability-determining unit and decodes the inner-code decoded signal with reference to the second indication signal to generate the output signal.

According to the claimed invention, a method for decoding an input signal to generate an output signal is disclosed. The method comprises determining burst noise locations corresponding to the input signal and generating a first indication signal accordingly, decoding the input signal to generate an inner-code decoded signal, selectively adopting one of a plurality of determining criteria according to the first indication signal to determine reliability information corresponding to the inner-code decoded signal and to generate a second indication signal accordingly, and decoding the inner-code decoded signal with reference to the second indication signal to generate the output signal.

These and other objectives of the present invention will no doubt become obvious to those of ordinary skill in the art after

DETAILED DESCRIPTION

Figure 1:
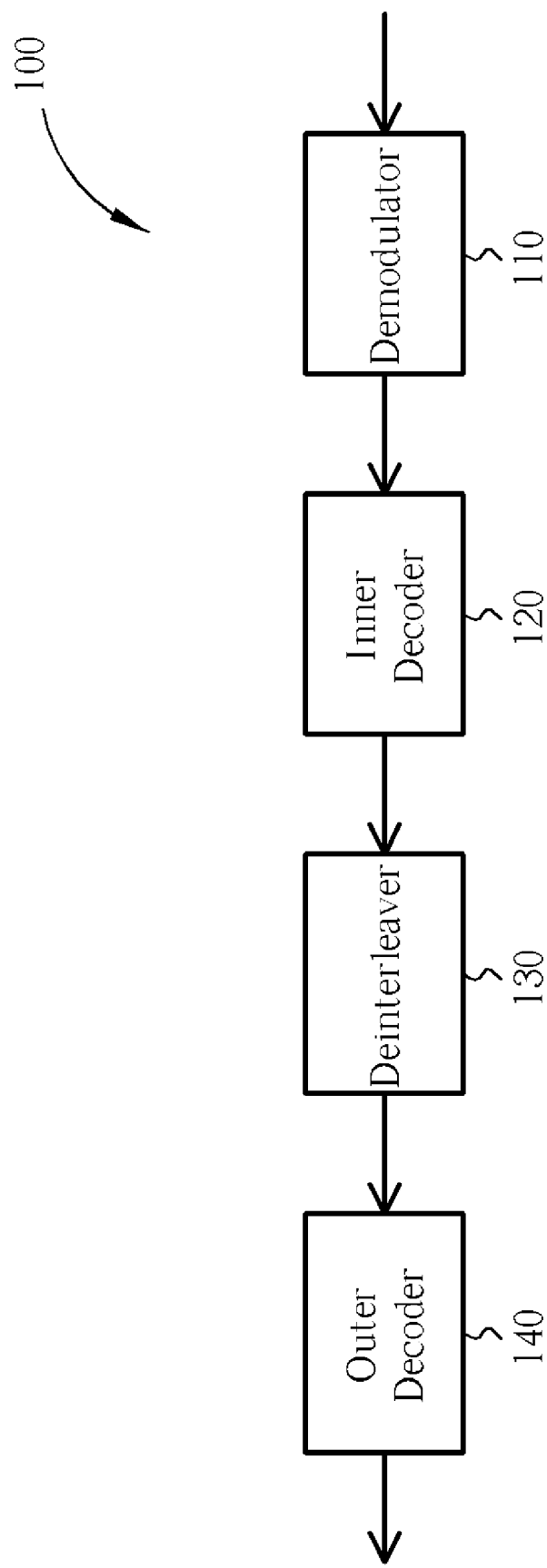
FIG. 1 shows a schematic diagram of a receiver for decoding concatenated codes according to a related art.
Figure 2:
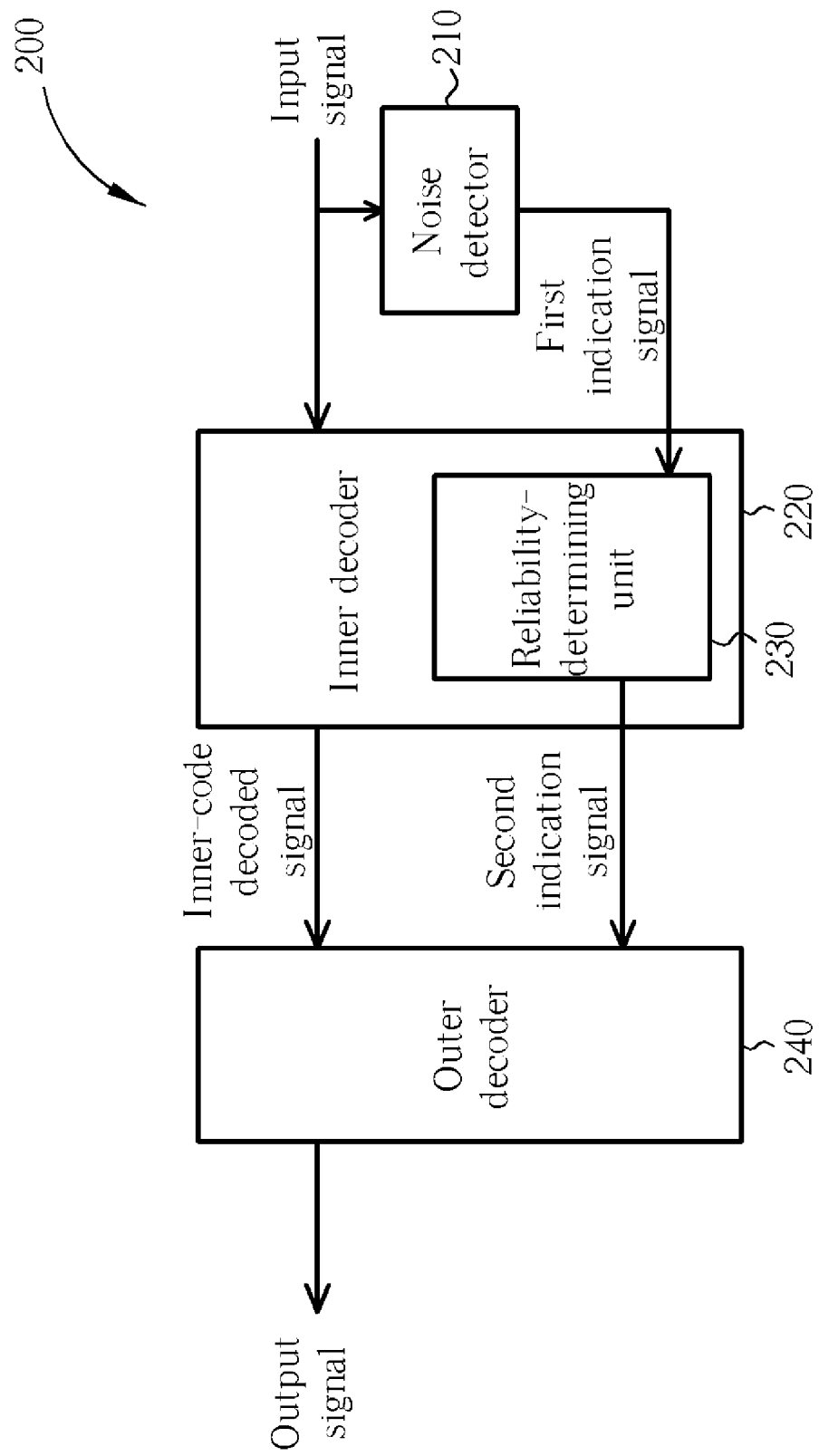
FIG. 2 shows a schematic diagram of an apparatus according to an embodiment of the present invention.

FIG. 2 shows a schematic diagram of an apparatus according to an embodiment of the present invention for decoding an input signal to generate an output signal. The apparatus 200 shown in FIG. 2 comprises a noise detector 210, an inner decoder 220, a reliability-determining unit 230, and an outer decoder 240.

The noise detector 210 determines burst noise locations corresponding to the input signal and generates a first indication signal accordingly. When burse noise, which might be induced by severe fading or interference, is detected, the noise detector 210 may assert the first indication signal. When burse noise is not detected, the noise detector 210 may de-assert the first indication signal. The apparatus 200 may be set inside a receiver comprising a demodulator for demodulating a preliminary signal to generate the input signal shown in FIG. 2. The noise detector 210 may function with reference to operations performed by the demodulator. There are several ways for the noise detector 210 to perform the burst noise detection function. For example, the noise detector 210 may determine burst noise locations corresponding to the input signal through a signal-to-noise ratio (SNR) measurement process. The noise detector 210 may also determine burst noise locations corresponding to the input signal by distribution of hard decision errors or by using a threshold detection of soft decision errors.

Depending on which kind of inner code is utilized in the input signal, a Viterbi decoder or a TCM decoder may implement the inner decoder 220, which decodes the input signal to generate an inner-code decoded signal. The reliability-determining unit 230 in this embodiment is set in the inner decoder 220 and selectively adopts one of a plurality of determining criteria according to the first indication signal to determine reliability information corresponding to the inner-code decoded signal and to generate a second indication signal accordingly. More specifically, in this embodiment, when the noise detector 210 asserts the first indication signal, the reliability-determining unit 230 will adopt a first determining criterion. When the noise detector 210 does not assert the first indication signal, the reliability-determining unit 230 will adopt a second determining criterion. In other words, the reliability-determining unit 230 of this embodiment determines the reliability of information corresponding to the inner-code decoded signal through an adaptive manner.

Figure 3:
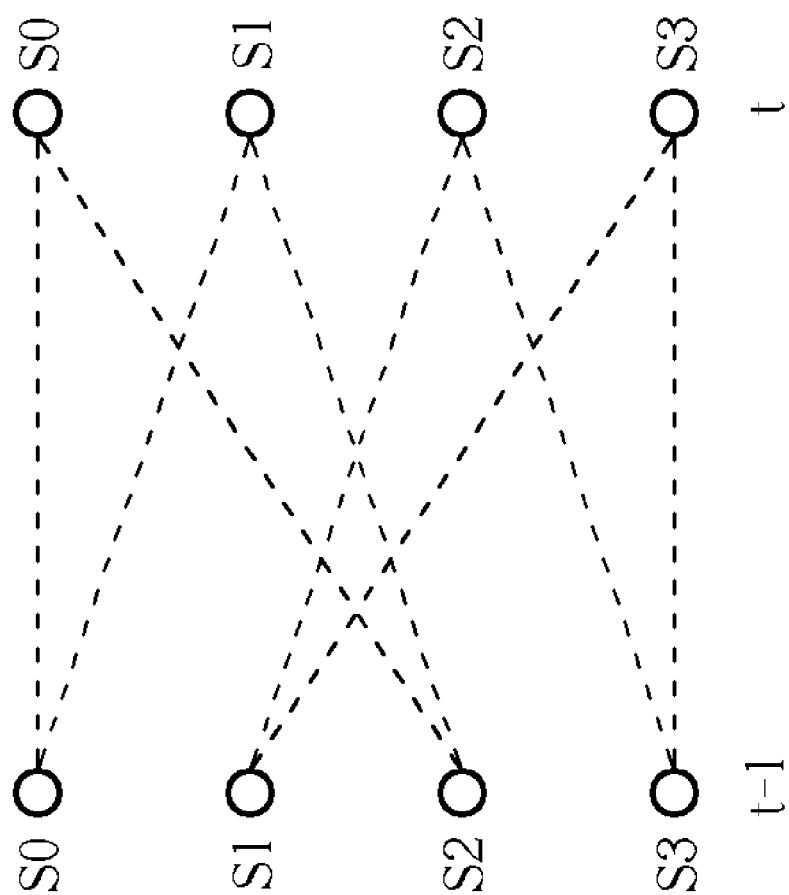
FIG. 3 shows an exemplary 4-state Trellis diagram of a Viterbi algorithm adopted by a Viterbi decoder.
Figure 4:
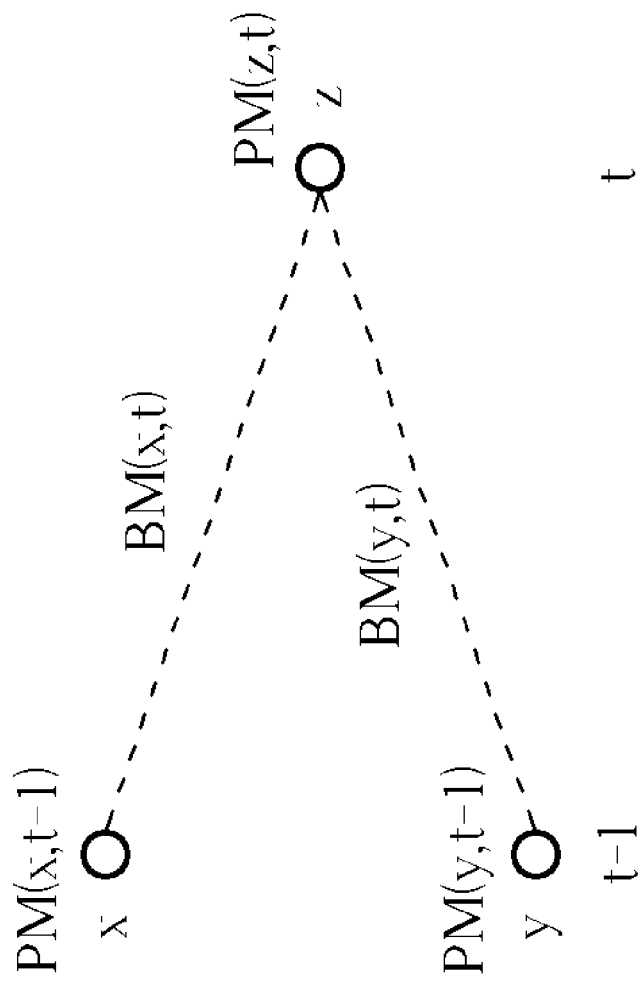
FIG. 4 shows a schematic diagram illustrating how path metrics are determined in the Viterbi algorithm.

As mentioned, a Viterbi decoder may implement the inner decoder 220. FIG. 3 shows an exemplary 4-state Trellis diagram of a Viterbi algorithm adopted by the Viterbi decoder 220. There are four possible states (S0, S1, S2, S3) in each time point. For each state, there are two possible branches that might lead the state; the two possible branches include an upper branch and a lower branch. Since the Viterbi algorithm is a minimum-distance decoding algorithm for convolutional codes, a path metric for each state and a branch metric for each branch are determined in the Viterbi algorithm. FIG. 4 shows a schematic diagram illustrating how path metrics are determined in the Viterbi algorithm. In FIG. 4, states x and y at time t−1 are two possible states that might lead to state z at time t. The path metrics of the states x and y at time t−1 are PM(x, t−1) and PM(y, t−1), respectively. The branch metrics of the upper and lower branches lead to the state z at time t are BM(x, t) and BM(y, t), respectively. There are two possible candidate path metrics that might be determined to be the path metric PM(z, t) of the state z at time t. A first candidate path metric is Upper_PM, which equals to PM(x, t−1)+BM(x, t); and a second candidate path metric is Lower_PM, which equals to PM(y, t−1)+BM(y, t). As mentioned, since the Viterbi algorithm is a minimum-distance decoding algorithm, a minimum value of the two candidate path metrics will be determined to be the path metric PM(z, t) of the state z at time t.

With reference to the Viterbi algorithm adopted by the Viterbi decoder 220, in this embodiment the reliability-determining unit 230 determines whether each state in a Trellis diagram of the Viterbi algorithm is reliable or unreliable through comparing a threshold with a difference between two candidate path metrics, such as the Upper_PM and Lower_PM shown in FIG. 4, of the state in the Viterbi algorithm. The threshold utilized by the reliability-determining unit 230 is adaptively adjusted according to the first indication signal generated by the noise detector 210. For example, when the first indication signal is asserted, the reliability-determining unit 230 will adopt a first determining criterion. Under this situation the reliability-determining unit 230 compares a first threshold Th_1 with the difference Diff between the two candidate path metrics Upper_PM and Lower_PM of the state. If the first threshold Th_1 is smaller than the difference Diff, the state will be marked by the reliability-determining unit 230 and be stored into memory. Otherwise, the reliability-determining unit 230 will not mark the state. When the first indication signal is not asserted, the reliability-determining unit 230 will adopt a second determining criterion. Under this situation the reliability-determining unit 230 compares a second threshold Th_2 with the difference Diff between the two candidate path metrics Upper_PM and Lower_PM of the state. If the second threshold Th_2 is smaller than the difference Diff, the state will be marked by the reliability-determining unit 230 and be stored in memory. Otherwise, the reliability-determining unit 230 will not mark the state. The first threshold Th_1 and the second threshold Th_2 are two different values that can be determined through experimental statistics. Preferably, the first threshold Th_1 is smaller than the second threshold Th_2 so that the first determining criterion adopted when the first indication is asserted is stricter than the second determining criterion adopted when the first indication is not asserted.

After the path metrics of the states in a Trellis diagram of the Viterbi algorithm are determined, a trace back procedure is performed by the Viterbi decoder 220 to find a survivor path, which is also called a trace back path. For a symbol in the inner-code decoded signal that corresponds to a marked state on the survivor path, the reliability-determining unit 230 asserts the second indication signal in a specific location corresponding to the symbol. For a symbol in the inner-code decoded signal that corresponds to a state on the survivor path without a mark, the reliability-determining unit 230 de-asserts the second indication signal in a specific location corresponding to the symbol.

Figure 5:
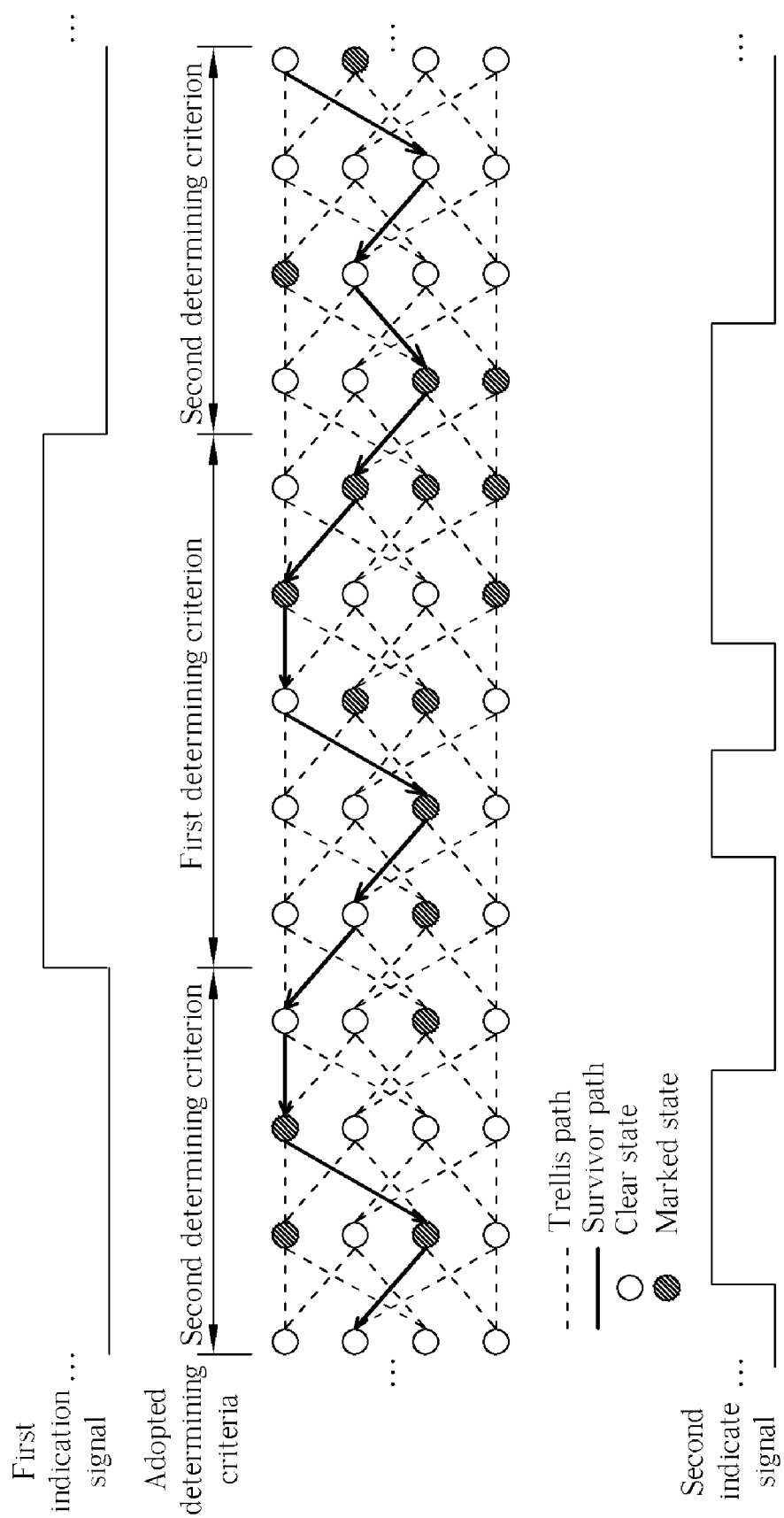
FIG. 5 shows a schematic diagram illustrating how the states of the second indication signal are determined in a trace back procedure.

FIG. 5 shows a schematic diagram illustrating how the states of the second indication signal are determined in a trace back procedure. The upper part of FIG. 5 illustrates the signal states of the first indication signal and the how different determining criteria does the reliability-determining unit 230 adopt according to the signal states of the first indication signal. As mentioned, when the noise detector 210 asserts the first indication signal, the reliability-determining unit 230 adopts a first determining criterion. When the noise detector 210 does not assert the first indication signal, the reliability-determining unit 230 adopts a second determining criterion.

The middle part of FIG. 5 is a Trellis diagram of the Viterbi algorithm performed by the Viterbi decoder 220. The inner-code decoded signal is generated according to the determined survivor path. The Viterbi decoder 220 according to the survivor path in the Trellis diagram determines the inner-code decoded signal. The lower part of FIG. 5 illustrates how the signal states of the second indication signal are determined according to marks on the survivor path on the Trellis diagram. As mentioned, for a marked state on the survivor path, the reliability-determining unit 230 asserts the second indication signal in a specific location corresponding to the marked state. For a state on the survivor path without a mark, the reliability-determining unit 230 de-asserts the second indication signal in a specific location corresponding to the unmarked state.

In this embodiment, an error-erasure decoder implements the outer decoder 240. The error-erasure decoder 240 decodes the inner-code decoded signal with reference to the second indication signal to generate the output signal. More specifically, the error-erasure decoder 240 decodes the inner-code decoded signal by regarding unreliable locations specified by the second indication signal as erasure locations corresponding to the inner-code decoded signal.

Since the reliability-determining unit 230 of the embodiment adaptively adopt different determining criterion according to the first indication signal to determine the reliability information corresponding to the inner-code decoded signal, even under different circumstances the second indication signal can still be accurately generated. With the accurately generated second indication signal, the error correction capability of the error-erasure decoder 240 is utilized more efficiently.

Please note that the diagram shown in Fig. 2 is only a schematic diagram drawn according to the embodiment of the present invention. If it is required, a deinterleaver can further be set in front of the input ends of the outer decoder 240 to deinterleave the inner-code decoded signal and the second indication signal before they are inputted into the outer decoder 240.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for decoding an input signal to generate an output signal, the apparatus comprising:

a noise detector for determining burst noise locations corresponding to the input signal and generating a first indication signal accordingly;

an inner decoder for decoding the input signal to generate an inner-code decoded signal;

a reliability-determining unit, coupled to the noise detector, for receiving the first indication signal generated from the noise detector, and selectively adopting one of a plurality of determining criteria according to the first indication signal to determine reliability information corresponding to the inner-code decoded signal and to generate a second indication signal accordingly; and an outer decoder, coupled to the inner decoder and the reliability-determining unit, for decoding the inner-code decoded signal with reference to the second indication signal to generate the output signal;

wherein if the first indication signal is asserted by the noise detector, the reliability-determining unit adopts a first determining criterion to determine the reliability information corresponding to the inner-code decoded signal, and if the first indication signal is not asserted by the noise detector, the reliability-determining unit adopts a second determining criterion to determine the reliability information corresponding to the inner-code decoded signal; and wherein the inner decoder decodes the input signal according to a Viterbi algorithm, for a state having two candidate path metrics in the Viterbi algorithm, if the first determining criterion is adopted, the reliability-determining unit determines a reliability corresponding to the state through comparing a first threshold with a difference between the two candidate path metrics; and if the second determining criterion is adopted, the reliability-determining unit determines the reliability corresponding to the state through comparing a second threshold with the difference.

2. The apparatus of claim 1, wherein the outer decoder comprises a Reed-Solomon (RS) error-erasure decoder.

3. The apparatus of claim 1, wherein the outer decoder decodes the inner-code decoded signal by regarding unreliable locations specified by the second indication signal as erasure locations corresponding to the inner-code decoded signal.

4. The apparatus of claim 1, wherein the noise detector asserts the first indication signal when burst noise is detected, and does not assert the first indication signal when the burst noise is not detected; and the first threshold is smaller than the second threshold.

5. A method for decoding an input signal to generate an output signal, the method comprising:

determining burst noise locations corresponding to the input signal and generating a first indication signal accordingly;

decoding the input signal to generate an inner-code decoded signal;

receiving the first indication signal generated from determining the burst noise locations corresponding to the input signal, and selectively adopting one of a plurality of determining criteria according to the first indication signal to determine reliability information corresponding to the inner-code decoded signal and to generate a second indication signal accordingly; and decoding the inner-code decoded signal with reference to the second indication signal to generate the output signal;

wherein the step of selectively adopting one of the plurality of determining criteria according to the first indication signal to determine the reliability information corresponding to the inner-code decoded signal further comprises:

when the first indication signal is asserted, adopting a first determining criterion to determine the reliability information corresponding to the inner-code decoded signal; and when the first indication signal is not asserted, adopting a second determining criterion to determine the reliability information corresponding to the inner-code decoded signal; and wherein the step of decoding the input signal to generate the inner-code decoded signal is performed according to a Viterbi algorithm, and for a state having two candidate path metrics in the Viterbi algorithm, the step of adopting the first determining criterion to determine the reliability information corresponding to the inner-code decoded signal comprises:

determining a reliability corresponding to the state through comparing a first threshold with a difference between the two candidate path metrics; and the step of adopting the second determining criterion to determine the reliability information corresponding to the inner-code decoded signal comprises:

determining the reliability corresponding to the state through comparing a second threshold with the difference.

6. The method of claim 5 further comprising:

providing a Reed-Solomon (RS) error-erasure decoder to perform the step of decoding the inner-code decoded signal with reference to the second indication signal to generate the output signal.

7. The method of claim 5, wherein the step of decoding the inner-code decoded signal with reference to the second indication signal to generate the output signal is performed by regarding unreliable locations specified by the second indication signal as erasure locations corresponding to the inner-code decoded signal.

8. The method of claim 5, wherein the first indication signal is asserted when burst noise is detected, and is not asserted when the burst noise is not detected; and the first threshold is smaller than the second threshold.

* * * * *